US008737949B2

(12) United States Patent
Ahrens et al.

(10) Patent No.: US 8,737,949 B2
(45) Date of Patent: May 27, 2014

(54) METHOD AND ARRANGEMENT FOR OPERATING A MOBILE BATTERY-OPERATED PERSONAL EMERGENCY SIGNAL DEVICE

(75) Inventors: Werner Ahrens, Paderborn (DE); Volkmar Bilke, Salzkotten (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 72 days.

(21) Appl. No.: 13/119,464

(22) PCT Filed: Sep. 24, 2009

(86) PCT No.: PCT/EP2009/006915
§ 371 (c)(1),
(2), (4) Date: May 11, 2011

(87) PCT Pub. No.: WO2010/037502
PCT Pub. Date: Apr. 8, 2010

(65) Prior Publication Data
US 2011/0223879 A1    Sep. 15, 2011

(30) Foreign Application Priority Data

Sep. 30, 2008  (DE) .......................... 10 2008 049 721

(51) Int. Cl.
*H04M 11/04* (2006.01)
*H04M 3/00* (2006.01)
*H04B 7/00* (2006.01)
*H04B 1/38* (2006.01)
*H04M 1/00* (2006.01)

(52) U.S. Cl.
USPC ........ 455/404.1; 455/420; 455/507; 455/565; 455/573

(58) Field of Classification Search
USPC ................... 455/572–574, 403, 404.1–404.2, 455/418–420, 343.5, 507, 517, 521, 550.1, 455/560–561, 565, 572–574; 340/500, 340/636.1, 636.19; 379/36–37, 45–46, 379/48–49, 51
See application file for complete search history.

(56) References Cited

U.S. PATENT DOCUMENTS 5,726,636 A * 3/1998 Hayes, Jr. .................. 340/636.1
5,870,685 A * 2/1999 Flynn ............................ 455/573
(Continued)

FOREIGN PATENT DOCUMENTS

EP     1804069 A1    7/2007
WO    00/39908 A1    7/2000

OTHER PUBLICATIONS

Written Opinion of the International Searching Authority for PCT/EP2009/006915 dated Jan. 8, 2010 (Form PCT/ISA/237) (German Translation).

(Continued)

*Primary Examiner* — Meless Zewdu
(74) *Attorney, Agent, or Firm* — Buchanan Ingersoll & Rooney PC

(57) ABSTRACT

The invention relates to a method for operating a mobile battery-operated personal emergency signal device, wherein a check of the charge of the battery feeding the personal emergency signal device is performed at least in the course of initiating the personal emergency signal device, wherein the operation of the personal emergency signal device is permitted by a central device depending on the result of the check. The invention further relates to an arrangement for performing the method.

20 Claims, 2 Drawing Sheets

(56) References Cited

U.S. PATENT DOCUMENTS

| | | | |
|---|---|---|---|
| 6,449,726 B1 | 9/2002 | Smith | |
| 6,956,488 B2* | 10/2005 | Hasegawa | 340/636.15 |
| 7,024,321 B1 | 4/2006 | Deninger et al. | |
| 2002/0086718 A1* | 7/2002 | Bigwood et al. | 455/572 |
| 2002/0128051 A1* | 9/2002 | Liebenow | 455/574 |
| 2003/0050039 A1 | 3/2003 | Baba et al. | |
| 2007/0152638 A1* | 7/2007 | Deprun | 320/134 |

OTHER PUBLICATIONS

Written Opinion of the International Searching Authority for PCT/EP2009/006915 dated Jan. 8, 2010 (Form PCT/ISA/237) (English Translation).

International Preliminary Report on Patentability for PCT/EP2009/006915 dated Apr. 5, 2011 (Form PCT/IB/373, PCT/ISA/237) (German Translation).

International Preliminary Report on Patentability for PCT/EP2009/006915 dated Apr. 5, 2011 (Form PCT/IB/373, PCT/ISA/237) (English Translation).

International Search Report of PCT/EP2009/006915 dated Jan. 8, 2010 (English).

International Search Report of PCT/EP2009/006915 dated Jan. 8, 2010 (German).

* cited by examiner

METHOD AND ARRANGEMENT FOR OPERATING A MOBILE BATTERY-OPERATED PERSONAL EMERGENCY SIGNAL DEVICE

CROSS-REFERENCE TO RELATED APPLICATIONS

This application is the United States national phase under 35 U.S.C. §371 of PCT International Patent Application No. PCT/EP2009/006915 filed on Sep. 24, 2009 claiming priority to German Patent Application No. 10 2008 049721.5, filed on Sep. 30, 2008.

BACKGROUND OF INVENTION

Embodiments relate to a method for operating a mobile battery-operated personal emergency signal as well as a system for operating a mobile battery-operated personal emergency signal device.

BACKGROUND OF RELATED ART

The use of personal emergency signal systems (PES) for ensuring faster assistance, especially for sick and infirm persons, is well-known. In these types of systems, normally a person is monitored by a so-called personal emergency signal device (PESD), which normally reports on startup or during use to a personal emergency signal call center (PESC) generally responsible for receiving emergency signals in the context of a wireless transmission and at regular intervals, continuously and/or making contact as needed.

Personal emergency signal devices are mobile devices because they must be carried by the person being monitored.

A disadvantage of this is that the battery supplying power to these mobile devices has a limited operating life.

BRIEF SUMMARY OF THE INVENTION

We provide a method and an arrangement that enable the maximum possible operating life of a personal emergency signal device to be provided at all times.

In a method according to the invention for operating a mobile battery-operated personal emergency signal device, at least one check of the charge level of the battery that powers the personal emergency signal device is performed in the course of initiating the personal emergency signal device, wherein the personal emergency signal device is permitted to operate by a central device depending on the result of the check.

DETAILED DESCRIPTION OF THE INVENTION

Figure 1:
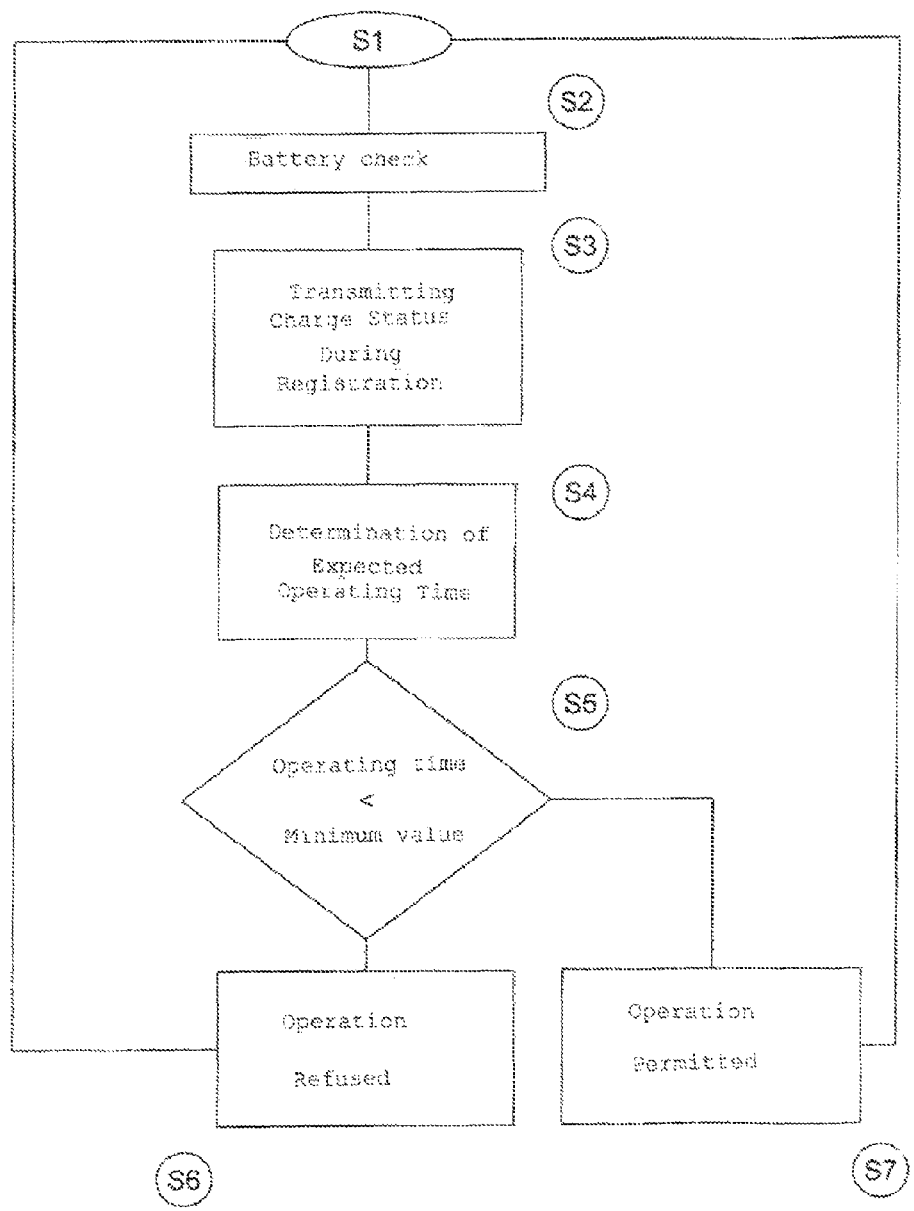
FIG. 1 shows a schematic flow diagram of an exemplary embodiment of the invention.
Figure 2:
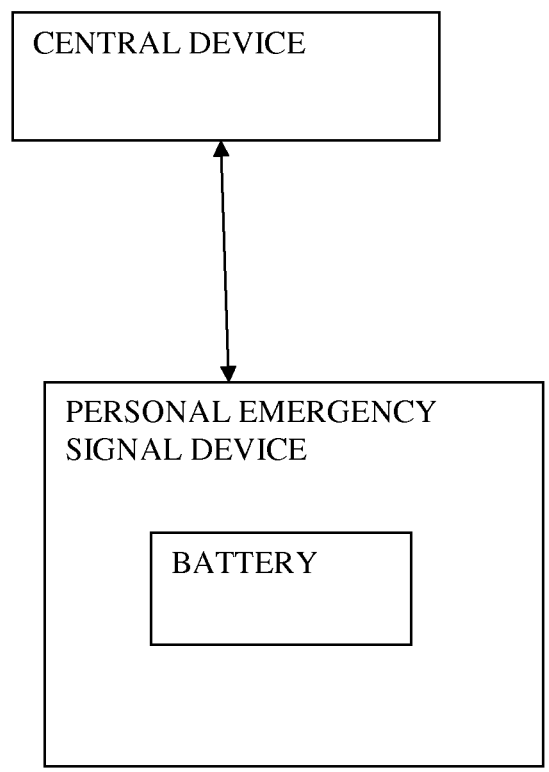
FIG. 2 illustrates a block diagram of an exemplary embodiment of the invention.

Referring to FIGS. 1-2, embodiments of the invention can be configured to prevent the operation of personal emergency signal devices that do not have sufficient battery charge for the customary operating time, which is normally eight hours as the minimum running time. Another advantage of embodiments of the invented method and system is that based on the process, an operation test can be integrated at least once during an initialization, which normally the user must perform and during which the different alarm modes are checked. If this test shows that some of the alarm modes are not functioning, initial startup is denied. Another advantage is that the object of the invention can also be integrated into this process in such a way that changes to existing devices are minimized and very little additional user expenditure is required and, based on the invention, the user does not have to check the charge level, e.g. through a visual check of a charge indicator, to be sure that this charge is sufficient for operation.

The check is preferably conducted by the personal emergency signal device, because this allows a very simple implementation of the invented method, requiring the device only to query the local available electrical signal.

It is preferable, as in a further advantageous embodiment, that after the check is performed, at least one piece of correlating information be transmitted to the central device regarding the operational status of the personal emergency signal device. This ensures that further steps can be taken at the site controlling the personal emergency signal system.

In an alternative embodiment of the invention, the check is conducted by the central device. This relieves the personal emergency signal devices of additional procedures that require more power and therefore would cause faster consumption of the battery.

As a preferred extension of the embodiment, at least one piece of information identifying the battery status is transmitted to the central device in the course of initiation, so that the central device can immediately evaluate it.

The check is preferably conducted as part of a registration occurring in the course of initiation of the personal emergency signal device, because the simple implementation already mentioned can be especially practical to carry out without significant outlay for customization.

If the initiation is triggered by switching the personal emergency signal device on and/or removing the personal emergency signal device from a battery charging device, a solution is offered in which the latest possible point in time is detected for the check, because removing the device is an indication that the user intends to carry the device with him or her.

This is further developed advantageously in that the check does not occur anymore when initiation is triggered by switching the device on, after removal from the battery charging device.

As an alternative or extension, the invented method can be further developed such that the check is repeated in periodic intervals after initiation occurs. This ensures that the resulting statuses detected will be very timely. In addition, in the process, discharges occurring at an above-average rate that shorten the originally determined operating time are also discovered. Therefore, unanticipated shortening of operating times can be detected and appropriate steps, such as emitting signals from the personal emergency signal device that prompt the user to seek out a charging station, can be initiated.

Operation is preferably only permitted if the check shows that the charge indicates at least one initial value such that, for example, a maximum discharge time value specified by the factory or a minimum discharge time value specified by the personal emergency signal system can be maintained.

The arrangement according to the invention for operating a mobile battery-operated personal emergency signal device is characterized by a means for carrying out the method or one of its further embodiments and thereby provides the advantageous contribution of offering an implementation that uses the method's advantages.

Additional advantages and details about the invention are explained using the exemplary embodiments of the invention shown in the figure.

In the figure, a possible implementation of the method is shown in a flow diagram, which includes both steps for a personal emergency signal device (PESD) functioning according to the invented method and steps for a personal emergency signal call center (PESC) functioning according to the invented method. After the PESD is switched on, it is automatically registered at the personal emergency signal call center (PESC), because these devices interact according to the invention.

The respective subprocesses carrying out this interaction can thereby run as interrupt-controlled background processes on the mentioned devices and be triggered by the corresponding specified events, such as switching on the PESD, for example, or be activated by removing the PESD from a charger.

Therefore, this background sequence status is shown as a first step S1, from which a transition to a second step S2 occurs after activation through one of the stated events, at which point the battery status check takes place. It is assumed here that this process takes place in the PESD.

This check provides at least one value, which will usually be an electrical variable that is correlated to an expected possible device operating time, but this is not immediately specified.

From there, a third step S3, the registration of the PESD at the PESC, is carried out. A component included in this registration is the transmission of the battery's charge status. A registration of this type can likewise be a consequence of one of the above mentioned trigger events, for example.

Using the charge status, the PESC determines the expected operating time of the PESD in a fourth step S4.

In a fifth step S5, the value determined is compared with a reference value.

This reference value can be the maximum possible operating time with a full charge or a minimum operating time that is less than the maximum possible operating time and specifically can be adjustable, as shown in the exemplary embodiment. If the value determined is below the reference value, operation of the PESD will be denied in a sixth step S6. This step can be supplemented here with another step (not shown) in which the user receives a warning, such as a message on the display and/or an acoustic warning.

However, if the result of the comparison is that the charge status allows the required operating time, then the PESD is permitted operation in a seventh step S7, wherein during the course of operation, for example, in one variation of the invention, the check takes place at regular intervals.

If the start-up procedure and/or operation test of the PESD is started in the PESC, likewise, an automatic PESD battery status message can be generated in the PESC. The PESC allows the PESD to operate only after a positive check of the charge status of the battery, and it should be noted here that normally this must be also be accomplished together with a successful check of the PESD alarm sensors by the PESC, but for the invention the minimum requirement provided is the check of the charge status. Additional tests are not absolutely required, but they can nevertheless be carried out, as long as they are of use in the course of implementing the invented procedure.

If recharging of the PESD takes place during its operation following monitoring by the PESC, for example, while storing the PESD in a charger during a break, no check of the battery status will be conducted after it is removed from the charger, because the permission to operate it has already been allowed and storing the device in the charger does not lead to a reduction, but rather an increase of the (minimum) charge.

The automatic check of the battery charge status at the beginning of a startup procedure and/or during an operation test of the PESD will likewise ensure that the power supply for the PESD is sufficient for the period of usage.

The method shown, and the alternatives that have been described here in part but not shown, all have in common that the operational reliability and with it the alarm function of the PESD is significantly increased in an emergency and the user is relieved of performing monitoring tasks for the device.

The invention claimed is:

1. A method for operating a mobile battery-operated personal emergency signal device comprising:
    upon a determination that the personal emergency signal device is switched on or removed from a battery charging device, a central device initiating a check of a battery powering the personal emergency signal device to check a charge status of the battery, the check being performed by the central device, the central device being communicatively connected to the personal emergency signal device, the check of the battery comprising:
    the central device communicating with the personal emergency signal device to receive information relating to the charge status of the battery and comparing the charge status of the battery to a threshold value, the threshold value defining a minimum amount of required operating time for the personal emergency signal device;
    upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and
    upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating.

2. The method of claim 1, wherein the central device prevents the personal emergency signal device to operate by communicating a warning to the personal emergency signal device for emitting to a user of the personal emergency signal device and denies operation of the personal emergency signal device such that the personal emergency signal device is not operational.

3. The method of claim 2, further comprising the personal emergency signal device communicating at least one piece of information correlating to the charge status to provide the information relating to the charge status to the central device; and
    transmitting the warning to the user of the personal emergency signal device via the personal emergency signal device upon the personal emergency signal device receiving communications from the central device to prevent the personal emergency signal device from operating.

4. The method of claim 1 wherein the personal emergency signal device communicating with the central device to register with the central device, wherein the check of the charge status of the battery is performed as part of the communicating with the central device to register with the central device, the communicating to register with the central device occurring during initiation of the personal emergency signal device.

5. The method of claim 4 comprising triggering registration of the personal emergency signal device with the central device by at least one member of the group consisting of switching the personal emergency signal device on and removing the personal emergency signal device from the battery charging device.

6. A method for operating a mobile battery-operated personal emergency signal device comprising:
triggering registration of the personal emergency signal device with a central device when the personal emergency signal device is switched on;
upon a determination that the personal emergency signal device is switched on or removed from a battery charging device, initiating a check of the battery powering the personal emergency signal device to check a charge status of the battery, the check being performed by the central device, the central device being communicatively connected to the personal emergency signal device, the check of the battery comprising:
the central device communicating with the personal emergency signal device to receive information relating to the charge status of the battery and comparing the charge status of the battery to a threshold value, the threshold value defining a minimum amount of required operating time for the personal emergency signal device;
upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and
upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating; and
wherein the personal emergency signal device communicating with the central device to register with the central device, wherein the check of the charge status of the battery is performed as part of the communicating with the central device to register with the central device, the communicating to register with the central device occurring during initiation of the personal emergency signal device; and
wherein the check of the charge status of the battery occurs upon switching of the personal emergency signal device on and does not occur after removal of the personal emergency signal device from a battery charging device.

7. The method of claim 6 wherein the threshold value is a value that corresponds to at least eight hours of operation of the personal emergency signal device.

8. A method for operating a mobile battery-operated personal emergency signal device comprising:
upon a determination that the personal emergency signal device is switched on or removed from a battery charging device, initiating a check of a battery powering the personal emergency signal device to check a charge status of the battery, the check being performed by a central device that is communicatively connected to the personal emergency signal device, the check of the battery comprising:
the central device communicating with the personal emergency signal device to receive information relating to the charge status of the battery and comparing the charge status of the battery to a threshold value, the threshold value defining a minimum amount of required operating time for the personal emergency signal device;
upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and
upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating; and
repeating the check of the charge status of the battery at periodic intervals.

9. The method of claim 8, wherein the threshold value is a value that corresponds to at least eight hours of operation of the personal emergency signal device.

10. A system for operating a mobile battery-operated personal emergency signal device, comprising a mobile battery-operated personal emergency signaling device including instructions to carry out the method according to claim 1 and a central device including instructions to carry out the method according to claim 1.

11. A method for operating a mobile battery-operated personal emergency signal device comprising:
upon a determination that the personal emergency signal device is switched on or removed from a battery charging device, initiating a check of a battery powering the personal emergency signal device to check a charge status of the battery, the check being performed by a central device that is communicatively connected to the personal emergency signal device, the check of the battery comprising:
the central device communicating with the personal emergency signal device to receive information relating to the charge status of the battery and comparing the charge status of the battery to a threshold value, the threshold value defining a minimum amount of required operating time for the personal emergency signal device;
upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and
upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating;

wherein the threshold value is a value that corresponds to at least eight hours of operation of the personal emergency signal device.

12. A method for operating a mobile battery-operated personal emergency signal device comprising:

upon a determination that the personal emergency signal device is switched on or removed from a battery charging device, initiating a check of a battery powering the personal emergency signal device to check a charge status of the battery, the check being performed by a central device that is communicatively connected to the personal emergency signal device, the check of the battery comprising:

the central device communicating with the personal emergency signal device to receive information relating to the charge status of the battery and comparing the charge status of the battery to a threshold value, the threshold value defining a minimum amount of required operating time for the personal emergency signal device, the personal emergency signal device communicating at least one piece of information correlating to the charge status to provide the information relating to the charge status to the central device;

upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating, the central device preventing the personal emergency signal device from operating when the battery is below the threshold value by communicating a warning to the personal emergency signal device for emitting to a user of the personal emergency signal device and denies operation of the personal emergency signal device such that the personal emergency signal device is not operational;

transmitting a warning to a user of the personal emergency signal device via the personal emergency signal device upon the personal emergency signal device receiving communications from the central device to prevent the personal emergency signal device from operating; and wherein the threshold value is a value that corresponds to at least eight hours of operation of the personal emergency signal device.

13. A method for operating a mobile battery-operated personal emergency signal device comprising:

upon a determination that the personal emergency signal device is switched on or removed from a battery charging device, initiating a check of a battery powering the personal emergency signal device to check a charge status of the battery, the check being performed by a central device that is communicatively connected to the personal emergency signal device, the check of the battery comprising:

the central device communicating with the personal emergency signal device to receive information relating to the charge status of the battery and comparing the charge status of the battery to a threshold value, the threshold value defining a minimum amount of required operating time for the personal emergency signal device;

upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating;

wherein the personal emergency signal device communicating with the central device to register with the central device, wherein the check of the charge status of the battery is performed as part of the communicating with the central device to register with the central device, the communicating to register with the central device occurring during initiation of the personal emergency signal device; and wherein the threshold value is a value that corresponds to at least eight hours of operation of the personal emergency signal device.

14. A communication system comprising
a central device; and
a mobile battery-operated personal emergency signal device communicatively connectable to the central device;

upon a determination that the personal emergency signal device is switched on or removed from a battery charging device, the central device initiating a check of a battery powering the personal emergency signal device to check a charge status of the battery, the check of the charge status being performed by the central device by the central device communicating with the personal emergency signal device to receive information relating to the charge status of the battery and comparing the charge status of the battery to a threshold value, the threshold value defining a minimum amount of required operating time for the personal emergency signal device;

upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating.

15. The system of claim 14 wherein the central device is comprised of a personal emergency signal call center.

16. The system of claim 14 wherein the central device prevents the personal emergency signal device to operate by communicating a warning to the personal emergency signal device for emitting to a user of the personal emergency signal device and denies operation of the personal emergency signal device such that the personal emergency signal device is not operational.

17. The system of claim 16 wherein the personal emergency signal device communicating at least one piece of information correlating to the charge status to provide the information relating to the charge status to the central device; and
  transmitting the warning to the user of the personal emergency signal device via the personal emergency signal device upon the personal emergency signal device receiving communications from the central device to prevent the personal emergency signal device from operating.

18. The system of claim 14 wherein the personal emergency signal device communicating with the central device to register with the central device, wherein the check of the charge status of the battery is performed as part of the communicating with the central device to register with the central device, the communicating to register with the central device occurring during initiation of the personal emergency signal device.

19. The system of claim 18 wherein registration of the personal emergency signal device with the central device is triggered by at least one member of the group consisting of switching the personal emergency signal device on and removing the personal emergency signal device from the battery charging device.

20. A communication system comprising
  a central device communicatively connectable to a mobile battery-operated personal emergency signal device;
  upon a determination that the personal emergency signal device is switched on or removed from a battery charging device, the central device initiating a check of a battery powering the personal emergency signal device to check a charge status of the battery, the check of the charge status being performed by the central device by the central device communicating with the personal emergency signal device to receive information relating to the charge status of the battery and comparing the charge status of the battery to a threshold value, the threshold value defining a minimum amount of required operating time for the personal emergency signal device;
  upon a determination by the central device that the charge status of the battery exceeds the threshold value such that the battery is charged sufficiently to power the personal emergency signal device for at least the minimum amount of required operating time, the central device communicating with the personal emergency signal device to permit the personal emergency signal device to operate; and
  upon a determination by the central device that the charge status of the battery is below the threshold value such that the battery is not charged sufficiently to power the personal emergency signal device for at least the minimum amount of required operating time, the central device communicating with the personal emergency signal device such that the central device prevents the personal emergency signal device from operating;
  the personal emergency signal device communicating with the central device to register with the central device, wherein the check of the charge status of the battery is performed as part of the communicating with the central device to register with the central device, the communicating to register with the central device occurring during initiation of the personal emergency signal device;
  wherein registration of the personal emergency signal device with the central device is triggered by at least one member of the group consisting of switching the personal emergency signal device on and removing the personal emergency signal device from the battery charging device; and
  wherein when registration is triggered by switching the device on, the check of the charge status of the battery occurs upon switching of the device on and does not occur after removal from the battery charging device.

* * * * *